United States Patent
Jung et al.

(10) Patent No.: US 9,446,795 B2
(45) Date of Patent: Sep. 20, 2016

(54) STRUCTURE FOR REINFORCING FRONT VEHICLE BODY

(71) Applicants: Hyundai Motor Company, Seoul (KR); Kia Motors Corporation, Seoul (KR)

(72) Inventors: Daewoo Jung, Seongnam-Si (KR); Joomin Jang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/559,488

(22) Filed: Dec. 3, 2014

(65) Prior Publication Data

US 2016/0046326 A1 Feb. 18, 2016

(30) Foreign Application Priority Data

Aug. 13, 2014 (KR) .................. 10-2014-0105266

(51) Int. Cl.
| | | |
|---|---|---|
| B62D 21/15 | (2006.01) | |
| B62D 25/08 | (2006.01) | |
| B62D 21/09 | (2006.01) | |
| B62D 21/11 | (2006.01) | |

(52) U.S. Cl.
CPC ............ B62D 21/155 (2013.01); B62D 21/09 (2013.01); B62D 21/11 (2013.01); B62D 25/082 (2013.01); *B60G 2204/15* (2013.01)

(58) Field of Classification Search
CPC .. B62D 21/155; B62D 21/09; B62D 27/065; B62D 25/082; B62D 21/11; B60G 2204/15
See application file for complete search history.

(56) References Cited

U.S. PATENT DOCUMENTS

| | | | | |
|---|---|---|---|---|
| 5,605,353 A | * | 2/1997 | Moss ..................... | B62D 21/09 188/376 |
| 5,884,963 A | * | 3/1999 | Esposito ................ | B62D 21/09 280/784 |
| 6,029,765 A | * | 2/2000 | Chou .................... | B60K 5/1216 180/292 |
| 6,705,627 B2 | * | 3/2004 | Hasebe .................... | B60G 7/02 280/124.134 |
| 7,380,829 B2 | * | 6/2008 | Kishima .............. | B62D 21/155 180/232 |
| 7,637,514 B2 | * | 12/2009 | Kim ...................... | B62D 25/088 180/312 |
| 7,771,137 B2 | * | 8/2010 | Anzai .................... | B62D 21/11 180/232 |
| 7,815,245 B2 | * | 10/2010 | Hiraishi .................. | B60R 19/12 293/155 |
| 8,246,061 B2 | * | 8/2012 | Kang ..................... | B62D 21/11 180/311 |

(Continued)

FOREIGN PATENT DOCUMENTS

| | | |
|---|---|---|
| JP | 7-187003 A | 7/1995 |
| JP | 9-99867 A | 4/1997 |

(Continued)

*Primary Examiner* — Paul N Dickson
*Assistant Examiner* — Timothy Wilhelm
(74) *Attorney, Agent, or Firm* — Morgan, Lewis & Bockius LLP

(57) ABSTRACT

A structure includes a front side member which may be disposed at left and right sides, respectively and includes a front end positioned at a vehicle front end, a fender apron member which includes a front end positioned at the vehicle front end based on the longitudinal direction of the vehicle, a fender apron front lower reinforcing member which connects and reinforces the front end of the front side member and the front end of the fender apron member, a sub-frame which is engaged to the front side member at its lower side, and a connection member of which a first end may be engaged to the fender apron front lower reinforcing member and of which a second end may be engaged to an connecting portion between the sub-frame and the front side member and the sub-frame to be movable when the connecting portion and the sub-frame receive an impact.

10 Claims, 8 Drawing Sheets

(56) References Cited

U.S. PATENT DOCUMENTS

| | | | | |
|---|---|---|---|---|
| 8,480,102 B2* | 7/2013 | Yamada | ............... | B62D 21/155 180/311 |
| 8,550,543 B2* | 10/2013 | Yoshida | ................ | B62D 25/08 280/784 |
| 8,794,646 B1* | 8/2014 | Onishi | ................ | B62D 21/155 280/124.109 |
| 8,851,520 B2* | 10/2014 | Goellner | ............... | B62D 21/155 280/784 |
| 9,096,275 B2* | 8/2015 | Yasui | .................... | B62D 21/11 |
| 9,150,252 B2* | 10/2015 | Yasui | .................... | B62D 21/11 |
| 2011/0233965 A1* | 9/2011 | Oka | ....................... | B62D 21/15 296/193.02 |
| 2014/0360798 A1* | 12/2014 | Ghislieri | .............. | B60K 5/1216 180/232 |

FOREIGN PATENT DOCUMENTS

| | | |
|---|---|---|
| JP | 10-45022 A | 2/1998 |
| JP | 2010-115946 A | 5/2010 |
| JP | 2013-10419 A | 1/2013 |
| KR | 10-0534268 | 12/2005 |

\* cited by examiner

STRUCTURE FOR REINFORCING FRONT VEHICLE BODY

CROSS-REFERENCE TO RELATED APPLICATION

The present application claims priority to and the benefit of Korean Patent Application No. 10-2014-0105266 filed on Aug. 13, 2014, the entire contents of which is incorporated herein for all purposes by this reference.

BACKGROUND OF THE INVENTION

1. Field of the Invention

The present invention relates to a structure for reinforcing a front vehicle body, and particularly, to a structure for reinforcing a front vehicle body which makes it possible to simultaneously enhance reaction performance against both a head-on collision and a front small overlap collision of a vehicle.

2. Description of Related Art

A front vehicle body is disposed at a front end of a vehicle based on the longitudinal direction of the vehicle, and is formed in a frame structure capable of forming an engine compartment. Such a front vehicle body includes a front end module which forms a front end of the engine compartment and wherein a cooling module, a head lamp, etc., are installed, a front fender apron member which forms both the left and right sides of the engine compartment and provides a space wherein a suspension system is disposed and where wheels are installed, and a dash panel which is disposed behind the engine compartment and partitions a passenger compartment from the engine compartment.

Also, a front side member extending in a longitudinal direction of a vehicle is disposed under the engine compartment in left and right directions in a widthwise direction of a vehicle, thereby reinforcing the structural strength of the front vehicle body. A sub-frame configured to support an engine and a transmission which are installed in the engine compartment by installing a suspension system is disposed at the bottom of the front side member in the height direction of the vehicle, and is connected to the front side member.

In recent years, a variety of methods for enhancing reaction performance against a front end collision of a vehicle have been proposed and actually applied to a front vehicle body structure.

In particular, a variety of research and development have progressed in an effort to enhance a collision reaction performance against both a front end collision wherein a vehicle has a head-on collision with another vehicle or collides with an object having a relatively wider collision area against a wider collision area, and a front small overlap collision wherein a vehicle collides with an object with a relatively smaller width or collides with a relatively smaller collision area from an outer side based on a widthwise direction of a barrier and a vehicle.

Further, in the front vehicle body structure, there is an urgent need to develop a front vehicle body connection structure which is capable of simultaneously enhancing collision reaction performance in case of both a head-on vehicle collision and a front small overlap collision in such a way to effectively connect the components of the front vehicle body.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for reinforcing a front vehicle body which makes it possible to enhance both a head-on collision reaction performance and a front small overlap collision reaction performance by connecting a front side member and a sub-frame by way of a connection member which may slide backward along a longitudinal direction of the vehicle when a front collision accident of a vehicle occurs and may rotate in a widthwise direction of a vehicle when a front small overlap collision accident occurs.

An aspect of the present invention provides a structure for reinforcing a front vehicle body including a front side member which extends along a longitudinal direction of a vehicle and is disposed at left and right sides, respectively, based on the widthwise direction of the vehicle, and may include a front end positioned at a vehicle front end based on the longitudinal direction of the vehicle, a fender apron member which extends along the longitudinal direction of the vehicle and is disposed at left and right sides, respectively, at an outer side of the front side member based on the widthwise direction of the vehicle and may include a front end positioned at the vehicle front end based on the longitudinal direction of the vehicle, a fender apron front lower reinforcing member which connects and reinforces the front end of the front side member and the front end of the fender apron member, a sub-frame which is engaged to the front side member at its lower side based on the height-wise direction of the vehicle, and a connection member of which one end is engaged to the fender apron front lower reinforcing member and of which the other end is engaged to an connecting portion between the sub-frame and the front side member and the sub-frame in such a way to be movable in the backward direction based on the longitudinal direction of the vehicle when the connecting portion and the sub-frame receive an impact, respectively.

The engaging units disposed at two positions of the other end of the connection member each may include a front engaging unit engaged to the sub-frame at a front side based on the longitudinal direction of the vehicle, and a rear engaging unit which is interposed at a portion where the sub-frame is engaged to the front side member and are engaged together. The other end of the connection member may include a slot, and the front engaging unit and the rear engaging unit may be inserted in the slot and be engaged to be movable along the slot.

The slot may include a slot extension which extends longer than the front engaging unit in a forward direction along the longitudinal direction of the vehicle.

The engaging portion of the end where the connection member is connected to the fender apron front lower reinforcing member may be positioned at a more outward position as defined based on the widthwise direction of the vehicle than the engaging portion of the other end engaged to the sub-frame.

The ends of the connection member may each be engaged using an engaging bolt.

The ends of the connection member may form an obtuse angle.

The connection member may be formed in a flange shape forming the rear engaging unit or in a beam shape which integrally extends from the rear engaging unit and generally may have a quadrangular box-shaped cross-section.

One end of the connection member may be engaged to two positions of the fender apron front lower reinforcing member.

The engaging units disposed at two positions of one end of the connection member each may include an outer engaging unit positioned at an outer side in the widthwise direction of the vehicle, and an inner engaging unit positioned at an inner side.

The outer engaging unit may be formed higher in the height-wise direction of the vehicle than the inner engaging unit, and a step unit stepped in the height-wise direction of the vehicle may be formed between the outer engaging unit and the inner engaging unit.

In the structure for reinforcing a front vehicle body according to the exemplary embodiment of the present invention, one end of the connection member is connected to the fender apron front lower reinforcing member which connects in the widthwise direction of the vehicle front end based on the longitudinal direction of the vehicle of the fender apron and the front end based on the longitudinal direction of the vehicle of the front side member, and the other end of the connection member is engaged at two positions to the sub-frame in such a way that the other end slides backward based on the longitudinal direction of the vehicle when an external impact is applied.

In case of a front small overlap collision accident of the vehicle, when an impacting object such as a barrier collides with the vehicle, away from the front side member, with the outer side as defined based on the widthwise direction of the vehicle, the fender apron front lower reinforcing member receives such impact, and the impact is transferred to the connection member.

Since the connection member is engaged at two positions to the sub-frame and is supported, the connection member generates a moment rotating about the engaging portion of the sub-frame toward the outer side as defined based on the widthwise direction of the vehicle as the impact is applied, and the support force with respect to such a moment is directly transferred to the sub-frame, so that in a case when the sub-frame may have a front small overlap collision accident, the sub-frame receives impact through the fender apron front lower reinforcing member and the connection member and is properly transformed, thus enhancing the front small overlap collision reaction performance.

Meanwhile, if the vehicle has a head-on collision over a wide area with an impacting object, the fender apron front lower reinforcing member, the connection member, and the front side member simultaneously receive impact from the impacting object. When the connection member receives impact on its front end, the connection member moves backward along the slot in the longitudinal direction of the vehicle, such that it does not perform the impact absorption function. Here, the front side member receives most of the impact and is properly compressed and transformed in the longitudinal direction, without buckling, so that the impact may be effectively absorbed and may decrease, thus enhancing the head-on collision reaction performance of the vehicle Therefore, in case of the front small overlap collision and the head-on collision of the vehicle, the front vehicle body receives impact and is properly transformed, thus effectively absorbing and decreasing overall damage of the vehicle body while protecting the driver and passenger of the vehicle more safely.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
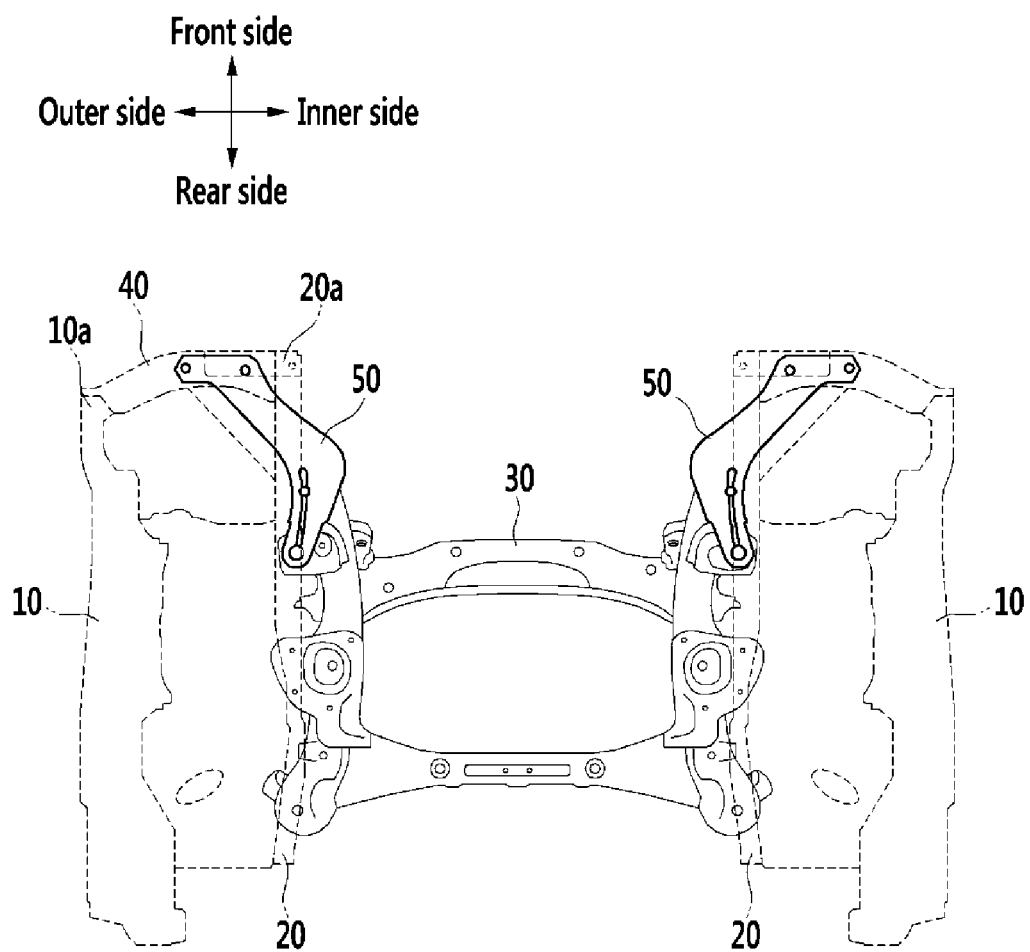
FIG. 1 is a plane view illustrating a structure for reinforcing a front vehicle body according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be in detail described with reference to the accompanying drawings.

Figure 2:
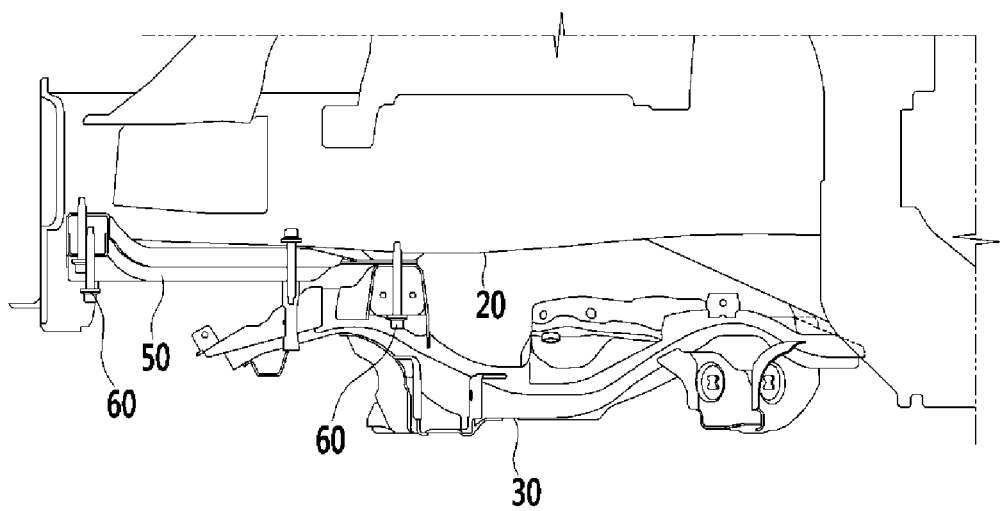
FIG. 2 is a side view illustrating a structure for reinforcing a front vehicle body according to an exemplary embodiment of the present invention.
Figure 3:
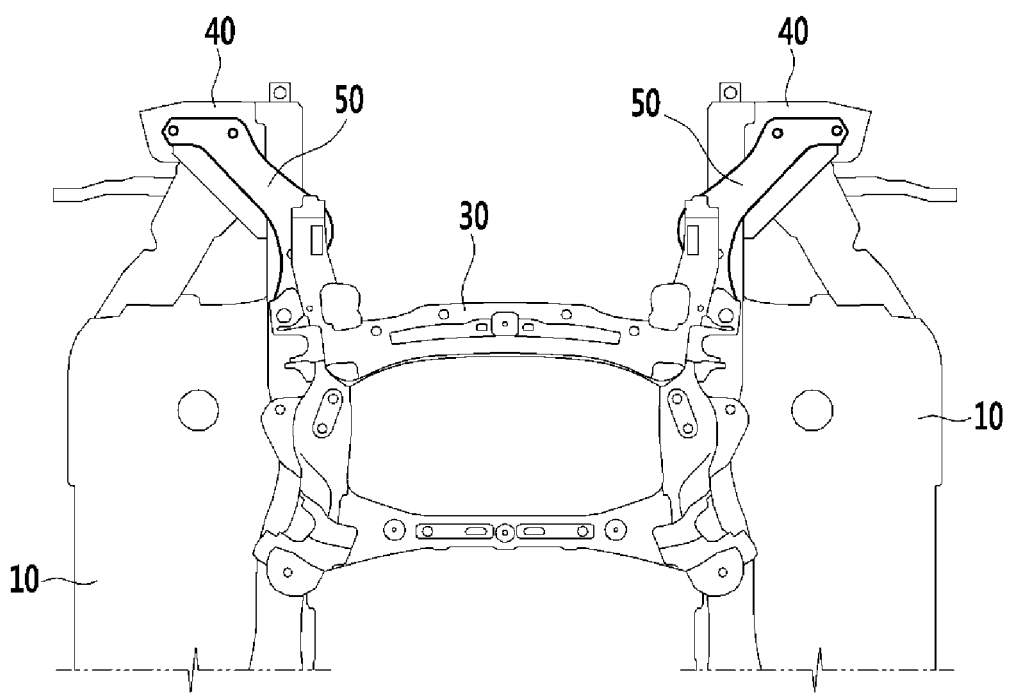
FIG. 3 is a bottom view illustrating a structure for reinforcing a front vehicle body according to an exemplary embodiment of the present invention.

Referring to FIG. 1 to FIG. 3, the structure for reinforcing a front vehicle body according to an exemplary embodiment of the present invention includes a fender apron member 10 which extends along a longitudinal direction of a vehicle and is disposed at left and right sides, respectively, in a widthwise direction of the vehicle.

The fender apron member 10 forms left and right sides of the engine compartment, and a suspension system may be engaged at the fender apron member 10. In the fender apron member 10, a space may be formed wherein wheels are installed.

A front side member 20 configured to mainly play a role of reinforcing the structure of the front vehicle body and absorb an impact when the vehicle has a head-on collision accident extends in the longitudinal direction of the vehicle, and is disposed at left and right sides in the widthwise direction of the vehicle and at an inner side of the fender apron member 10 along the widthwise direction of the vehicle, thereby being engaged to the fender apron member 10.

A sub-frame 30 is configured to support the engine and the transmission installed in the engine compartment by installing a suspension system and the like lower than the front side member 20 and is engaged to the front side member 20.

The fender apron member 10 includes a front end 10a which protrudes forward along the longitudinal direction of the vehicle, and the front end 10a may be connected by way of a front end 20a of the front side member 20 and a fender apron front lower reinforcing member 40.

The fender apron front lower reinforcing member 40 may extend along the widthwise direction of the vehicle.

A connection member 50 has one end engaged to the fender apron front lower reinforcing member 40 and the other end engaged to the sub-frame 30, thereby interconnecting the fender apron front lower reinforcing member 40 and the sub-frame 30.

One end of the connection member 50 may be engaged at two positions to the lower surface of the fender apron front lower reinforcing member 40.

The other end of the connection member 50 may be engaged at two positions to the upper surface of the sub-frame 30.

The ends of the connection member 50 may be engaged using a bolt 60 or by device of welding and the like.

One end of the connection member 50 which is engaged to the fender apron front lower reinforcing member 40 may be disposed at an outer side of the other end engaged to the sub-frame 30 based on the widthwise direction of the vehicle.

The connection member 50 may be formed in a shape connecting the ends at an obtuse angle.

Figure 4:
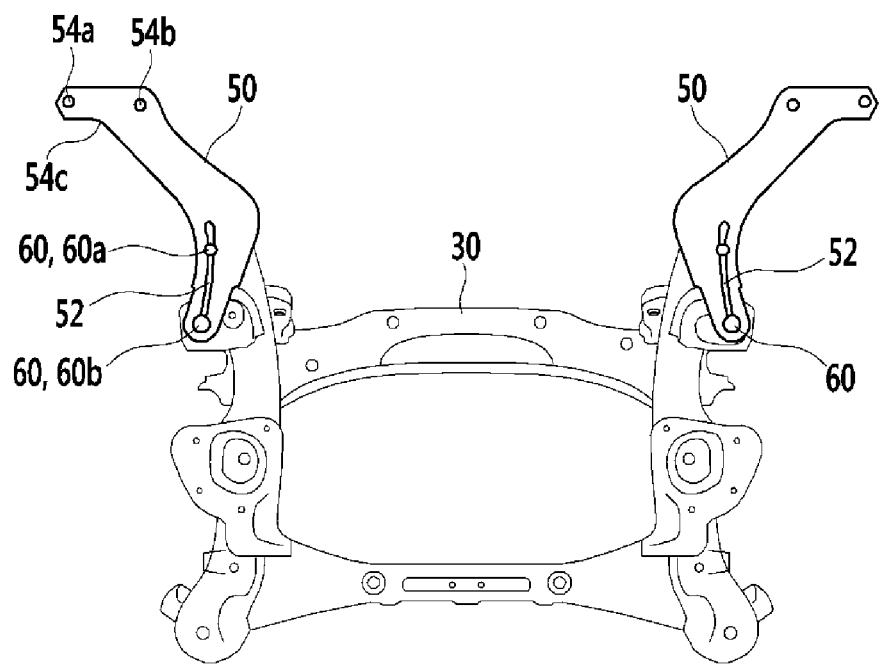
FIG. 4 is a plane view illustrating a state in which a connection member is engaged to a sub-frame according to an exemplary embodiment of the present invention.
Figure 5:
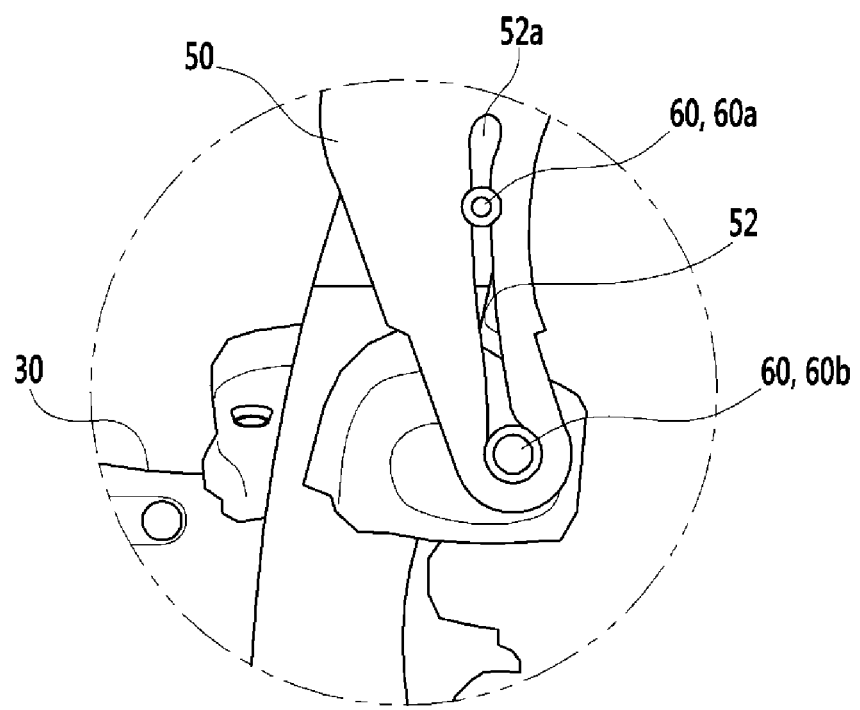
FIG. 5 is an enlarged view of key components of FIG. 4.
Figure 6:
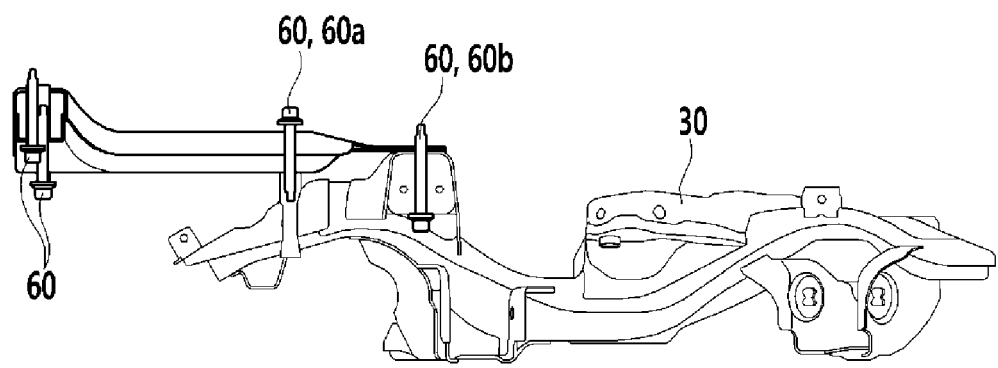
FIG. 6 is a side view of FIG. 4.

Referring to FIG. 4 to FIG. 6, the portion where the connection member 50 engaged to the sub-frame 30 may include a front engaging unit 60a positioned at the front end of the vehicle, and a rear engaging unit 60b positioned at the rear end of the connection member 50.

The front engaging unit 60a may be engaged to the sub-frame 40 by way of the engaging bolt 60.

The rear engaging unit 60b is disposed between the sub-frame 30 and the front side member 20, so that the rear engaging unit 60b may be inserted in an connecting portion between the sub-frame 30 and the front side member 20 such that they may be engaged together.

A slot 52 is formed at the front engaging unit 60a and the rear engaging unit 60b of the connection member 50, so that the engaging bolt 60 may be inserted and engaged through the slot 62.

The slot 52 may include a slot extension 52a which extends further forward than the front engaging unit 60a.

The rear engaging unit 60b may be formed in a flange shape having a thin thickness.

The connection member 50 forms the flange-shaped rear engaging unit 60b and integrally extends along with the rear engaging unit 60b, and is formed as a whole in a beam shape having a quadrangle box-shaped cross-section.

One end of the connection member 50 which is engaged to the fender apron front lower reinforcing member 40 may be engaged at two positions to the fender apron front lower reinforcing member 40.

The engaging unit of the one end may include an outer engaging unit 54a positioned at the outer side in the widthwise direction of the vehicle, and an inner engaging unit 54b positioned at the inner side.

The outer engaging unit 54a may be disposed higher than the inner engaging unit 50b.

That is, a stepped portion 54c stepped toward the heightwise direction of the vehicle may be formed between the outer engaging unit 54a and the inner engaging unit 54b.

The outer engaging unit 54a and the inner engaging unit 50b may be engaged to the fender apron front lower reinforcing member by device of the engaging bolt 60.

Figure 7:
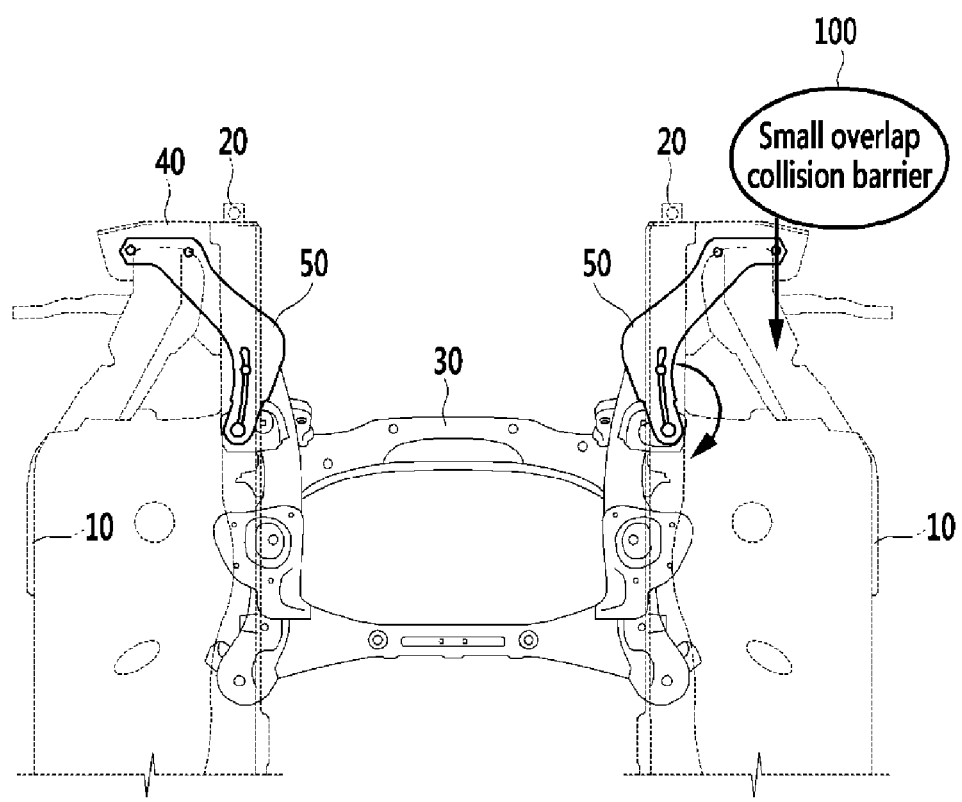
FIG. 7 is a view for describing impact absorption of a structure for reinforcing a front vehicle body in case of a front small overlap collision accident according to an exemplary embodiment of the present invention.

Referring to FIG. 7, in a case when the vehicle equipped with the structure for reinforcing a front vehicle body according to the exemplary embodiment of the present invention collides with an impacting object (e.g., a small overlap collision barrier 100) with a relatively narrower width, more specifically, in a case when the impacting object collides away from the front side member 20 with the outer portion of the vehicle body based on the widthwise direction of the vehicle, the fender apron front lower reinforcing member 40 and the connection member connected to the fender apron front lower reinforcing member 40 receive an impact.

The other end of the connection member 50 generates a moment as indicated by the arrow about two engaging units, namely, the front engaging unit 60a and the rear engaging unit 60b both operating as the support points by the transferred impact, and the support force with respect to such moment is shared by the sub-frame 30 and the front side member 30 to which the connection member 50 is connected via the front engaging unit 60a and the rear engaging unit 60b, thus properly absorbing the impact in case of the small overlap collision accident and effectively decreasing such impact.

Figure 8:
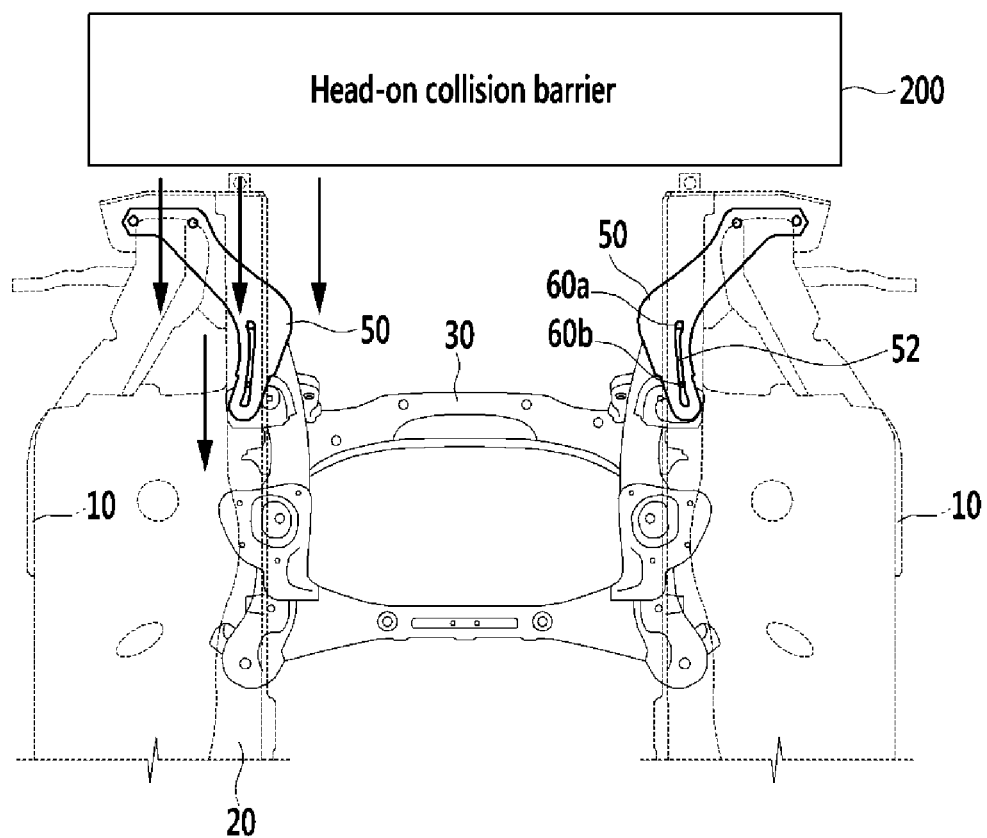
FIG. 8 is a view for describing impact absorption of a structure for reinforcing a front vehicle body in case of a head-on collision accident according to an exemplary embodiment of the present invention.

Referring to FIG. 8, in a case when the vehicle equipped with the structure for reinforcing a front vehicle body according to the exemplary embodiment of the present invention collides with an impacting object (head-on collision barrier 200) with a relatively wider width, more specifically, in a case when the front side member 20 as well as the fender apron front lower reinforcing member 40 and the connection member 50 concurrently receive an impact, the front side member 20 receives most of the impact and is compressed and transformed in its longitudinal direction, thus absorbing the impact, which is preferred.

To this end, the connection member 50 receives impact and is pushed in a backward direction as defined based on the longitudinal direction of the vehicle, more specifically, the connection member 50 is pushed backward by the length of the slot extension 52a while the front engaging unit 60a and the rear engaging unit 60b of the connection member 50 are moving along the slot 52, and despite the backward movement as defined based on the longitudinal direction of the vehicle, the connection member 50 does not transfer impact to the portion engaged to the front side member 20 of the head-on collision barrier 200, so that the front side member 20 receives most of the collision impact and is compressed and transformed in its longitudinal direction without being buckled at a predetermined portion based on the longitudinal direction, thus effectively absorbing and decreasing the impact.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for reinforcing a front vehicle body, comprising:
   a front side member extending along a longitudinal direction of a vehicle and is disposed at left and right sides, respectively, based on a widthwise direction of the vehicle and includes a front end positioned at a vehicle front end based on the longitudinal direction of the vehicle;
   a fender apron member extending along the longitudinal direction of the vehicle and disposed at left and right sides, respectively, at an outer side of the front side member based on the widthwise direction of the vehicle and comprising a front end positioned at the vehicle front end based on the longitudinal direction of the vehicle;
   a fender apron front lower reinforcing member connecting and reinforcing the front end of the front side member and the front end of the fender apron member;
   a sub-frame engaged to the front side member at a lower side thereof based on a height-wise direction of the vehicle; and
   a connection member of which a first end is engaged to the fender apron front lower reinforcing member and of which a second end is engaged to a connecting portion between the sub-frame and the front side member to be movable in a backward direction based on the longitudinal direction of the vehicle when the connecting portion and the sub-frame receive an impact, respectively.

2. The structure of claim 1, wherein the second end of the connection member comprises:
   a front engaging unit engaged to the sub-frame at the front end based on the longitudinal direction of the vehicle; and
   a rear engaging unit interposed at the connecting portion and engaged therein,
   wherein a slot extends along the longitudinal direction of the vehicle at the second end of the connection member, and
   wherein the front engaging unit and the rear engaging unit are inserted in the slot and are engaged to be movable along the slot.

3. The structure of claim 2, wherein the slot comprises a slot extension extending longer than the front engaging unit in a forward direction based on the longitudinal direction of the vehicle.

4. The structure of claim 2, wherein the connection member comprises:
   a flange shape forming the rear engaging unit; and
   a beam shape integrally extending from the rear engaging unit and having a quadrangular box-shaped cross-section.

5. The structure of claim 1, wherein an engaging portion of the first end where the connection member is engaged to the fender apron front lower reinforcing member is positioned at a more outward position as defined based on the widthwise direction of the vehicle than the engaging portion of the second end engaged to the sub-frame.

6. The structure of claim 5, wherein the first and second ends of the connection member form an obtuse angle.

7. The structure of claim 1, wherein the first and second ends of the connection member are each engaged using an engaging bolt.

8. The structure of claim 1, wherein the first end of the connection member is engaged at two positions to the fender apron front lower reinforcing member.

9. The structure of claim 8, wherein the engaging units disposed at two positions of the first end of the connection member comprise:
   an outer engaging unit positioned at the outer side as defined based on the widthwise direction of the vehicle; and
   an inner engaging unit positioned at an inner side.

10. The structure of claim 9,
   wherein the outer engaging unit is disposed higher in the height-wise direction of the vehicle than the inner engaging unit; and
   wherein a step unit stepped toward the height-wise direction of the vehicle is formed between the outer engaging unit and the inner engaging unit.

* * * * *